United States Patent Office 3,038,941
Patented June 12, 1962

3,038,941
PROCESS FOR PREPARING POLY-
FLUOROALDEHYDES
Otto Stallmann, Bridgeton, N.J., assignor to E. I. du Pont de Nemours and Company, Wilmington, Del., a corporation of Delaware
No Drawing. Filed Mar. 23, 1959, Ser. No. 800,935
8 Claims. (Cl. 260—603)

This invention relates to a novel process for preparing polyfluoroaldehydes and particularly to preparing them directly from the corresponding polyfluoroalkanols.

The polyfluoroaldehydes, which are obtained by the process of this invention, have the formula $X(CF_2)_nCHO$ wherein X represents hydrogen or fluorine and $n$ is an integer of from 2 to 24. Such polyfluoroaldehydes are well known compounds which are valuable for many purposes. The polyfluoroaldehydes, in which X represents hydrogen, are disclosed by N. O. Brace in Patent No. 2,842,601 and are disclosed therein as being useful for the preparation of useful hemiacetals. Those polyfluoroaldehydes, in which X represents fluorine, are disclosed by Husted et al. in Patents 2,568,500 and 2,681,370. In general, the polyfluoroaldehydes obtained by this invention undergo reactions similar to those of unfluorinated aliphatic aldehydes, and thus provide fluorine-containing products that exhibit oil and water repellency and serve as agents for the treatment of paper, textiles, and the like, to impart such properties to those materials. Also, the polyfluoroaldehydes are useful as intermediates in making other fluorine-containing compounds and compositions, such as synthetic resins, polymers, dyes, medicinals and insecticides. Still other uses of these polyfluoroaldehydes are disclosed in the aforementioned patents to Brace and to Husted et al.

Heretofore such polyfluoroaldehydes have been made by complex and sometimes hazardous processes.

It is an object of the present invention to provide a simple, one-step process for producing polyfluoroaldehydes of the before-mentioned class. Another object is to prepare such polyfluoroaldehydes directly from polyfluoroalkanols. A particular object is to provide a process for oxidizing polyfluoroalkanols to polyfluoroaldehydes employing elementary fluorine as the oxidizing agent without breaking the carbon chain and without loss of the functional group. Other objects are to advance the art. Still other objects will appear hereinafter.

The above and other objects may be accomplished in accordance with this invention which comprises preparing polyfluoroaldehydes of the formula $X(CF_2)_nCHO$ wherein X represents a member of the group consisting of hydrogen and fluorine and $n$ is an integer of from 2 to 24 which comprises passing gaseous fluorine into a solution of a polyfluoroalcohol of the formula $X(CF_2)_nCH_2OH$ wherein X represents a member of the group consisting of hydrogen and fluorine and $n$ is an integer of from 2 to 24 in from 1 to about 10 parts by weight of anhydrous liquid hydrogen fluoride maintained at a temperature between $-10°$ C. and $+5°$ C., the fluorine being employed in a proportion of at least about 1 mole for each mole of the polyfluoroalcohol and being passed into the solution at about the rate at which it is consumed in the reaction.

Heretofore, attempts to treat polyfluoroalcohols of the class employed in this invention, particularly those which contain an omega-hydrogen atom, with elementary fluorine have resulted in destructive fragmentation of the carbon chain and loss of the functional group at the end of the chain. However, it has been found that by treating the polyfluoroalcohols with fluorine under the conditions above set forth, the polyfluoroalcohols are oxidized to the polyfluoroaldehydes without breaking the carbon chain, with at least partial replacement of omega-hydrogen atoms when present, and with a minimum of over-oxidation to carboxylic acids and decarboxylation of the acids to polyfluorocarbons.

The starting alcohols, which are employed in the process of this invention, have the formula $X(CF_2)_nCH_2OH$ wherein X represents hydrogen or fluorine, preferably hydrogen, and $n$ represents an integer of from 2 to 24, preferably 2 to 10. The $1H,1H,\omega H$-polyfluoroalcohols, having the formula $H(CF_2)_nCH_2OH$, and methods of preparing them are disclosed by J. M. Joyce in Patent 2,559,628. Representative members of such polyfluoroalcohols are: 1H,1H,3H-tetrafluoro-1-propanol, $HCF_2CF_2CH_2OH$; 1H,1H,5H-octafluoro-1-pentanol, $H(CF_2CF_2)_2CH_2OH$; 1H,1H,9H-hexadecafluoro-1-nonanol, $H(CF_2CF_2)_4CH_2OH$; and 1H,1H,11H-eicosafluoro-1-undecanol,

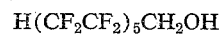

$$H(CF_2CF_2)_5CH_2OH$$

The 1H,1H - polyfluoroalcohols, having the formula $F(CF_2)_nCH_2OH$, and the method of preparing them are disclosed by Husted et al. in Patent 2,666,797. Representative members of this class of polyfluoroalcohols are: 1H,1H-pentafluoro-1-propanol, $FCF_2CF_2CH_2OH$; 1H,1H-nonafluoro-1-pentanol, $F(CF_2)_4CH_2OH$; 1H,1H-pentadecafluoro-1-octanol, $F(CF_2)_7CH_2OH$; and 1H,1H-heptadecafluoro-1-nonanol, $F(CF_2)_8CH_2OH$.

The process is simply carried out by passing elementary fluorine into a solution of the polyfluoroalcohol in anhydrous liquid hydrogen fluoride while maintaining the solution at a temperature between $-10°$ C. and $+5°$ C. in equipment which is adapted for handling anhydrous liquid hydrogen fluoride and fluorine gas, and in which the low temperature of the reaction may be maintained and the flow of the fluorine gas to the reaction chamber may be readily controlled. Suitable equipment of this character is well known to the art.

The amount of the polyfluoroalcohol in the anhydrous liquid hydrogen fluoride usually will be in the proportion of about 1 to about 10 parts of hydrogen fluoride for each part of the alcohol. More dilute solutions can be used but, in general, are unnecessary and uneconomical. Preferably, the hydrogen fluoride will be in a proportion of about 1.4 to about 2 parts for each part of the polyfluoroalcohol, most desirably about 1.5 parts.

The elementary fluorine may be pure but more conveniently will usually be diluted with an inert gas such as nitrogen. When used, the nitrogen conveniently will be in the proportion of from about 0.1 part to about 1 part by weight for each part of fluorine, preferably about 0.2 part per part of fluorine.

The rate of introduction of the fluorine into the solutions should be controlled so that it is fed only about as fast as it is consumed in the reaction. More than a slight excess wastes fluorine needlessly and large amounts of unreacted gas streaming through the reactor tend to cause a mechanical loss of the hydrogen fluoride solvent and of the reaction products in the exit gases. Preferably, the rate of feed of the fluorine is controlled so that the exit gases from the reactor contain only traces of fluorine, such as that which will turn starch-potassium or cadmium iodide test paper only a faint blue.

The amount of the fluorine fed into the solution should be equal to at least 1 mole, preferably at least 1.1 moles, for each mole of the polyfluoroalcohol and will depend upon the polyfluoroalcohol employed and the polyfluoroaldehyde to be obtained. One mole of fluorine is theoretically required when the polyfluoroalcohol has the formula $F(CH_2)_nCH_2OH$, and also when the polyfluoroalcohol has the formula $H(CF_2)_nCH_2OH$ and it is desired to obtain the corresponding omega-hydrogen polyfluoroaldehyde as the principal product. This is shown by the equation $$X(CF_2)_nCH_2OH + F_2 \rightarrow X(CF_2)_nCHO + 2HF$$

When the polyfluoroalcohol has the formula $$H(CF_2)_nCH_2OH$$

and it is desired to obtain high yields of the polyfluoroaldehyde in which the omega-hydrogen is replaced by fluorine, at least 2 moles of fluorine are theoretically required for each mole of the polyfluoroalcohol. The reactions in this case may be represented by the following equations:

(1) $H(CF_2)_nCH_2OH + F_2 \rightarrow H(CF_2)_nCHO + 2HF$
(2) $H(CF_2)_nCHO + F_2 \rightarrow F(CF_2)_nCHO + HF$ or (3) $H(CF_2)_nCH_2OH + 2F_2 \rightarrow F(CF_2)_nCHO + 3HF$ Reaction 2 also occurs to some extent when less than 2 moles of fluorine are employed. Usually, a 10% excess of fluorine, over that theoretically required, will be employed. Up to about 5 moles of fluorine may be used conveniently. Higher proportions of fluorine can be used but are wasteful of fluorine and tend to cause over-oxidation and decrease in the yield of the desired aldehyde. Preferably, the fluorine will be in a proportion of from 1.1 to about 5 moles for each mole of the polyfluoroalcohol and, when it is desired to produce high yields of aldehydes in which X is fluorine from the alcohols in which X is hydrogen, from 2.2 to about 5 moles of fluorine for each mole of such polyfluoroalcohol. A practical working range is about a 10% to about 30% excess fluorine over the theoretical quantity required to produce the desired polyfluoraldehyde.

The reaction should be carried out at a temperature between $-10°$ C. and $+5°$ C., preferably between $-5°$ C. and $+5°$ C. Materially lower temperatures decrease the reaction rate to an undesirable extent but do not alter the course of the reaction. Temperatures above 5° C. promote the oxidation of the alcohols to the corresponding acids and the decarboxylation of the acids to the polyfluorocarbons, and temperatures materially above 5° C. fail to produce polyfluoroaldehydes in the products. For example, at 15° C., the fluorination products are polyfluoroalkanoic acids and polyfluorocarbons.

In order to more clearly illustrate this invention, a preferred mode of practicing it, and the advantageous results obtained thereby, the following examples are given in which the parts are by weight except where specifically indicated otherwise.

EXAMPLE 1

The equipment employed comprised a cylindrical copper reactor provided with a perforated copper plate near the bottom, means for feeding gaseous fluorine to the bottom of the reactor below said plate and an outlet tube at the top for the escape of gases, said tube leading to an acetone/carbon dioxide cooled trap for condensing volatile products. The reactor was provided with external cooling means and, above the perforated plate, was filled with copper tacks.

Before any reaction was run, the equipment was preconditioned. That is, all of the air in the lines and in the reactor was replaced with oxygen-free, dry nitrogen. Then fluorine was admitted in gradually increased amounts while the nitrogen gas flow was decreased. One exposure to concentrated fluorine gas for 10 to 15 minutes, the copper walls of the gas lines and of the reactor and the copper tacks became coated with a protective layer of copper fluoride. The excess fluorine was then replaced with nitrogen.

Into the reactor were charged, under a blanket of nitrogen, 70 grams of anhydrous hydrogen fluoride and 50 grams of 1H,1H,5H-octafluoro-1-pentanol. A slow stream of a fluorine-nitrogen mixture, having a ratio of about 5 parts of fluorine to 1 part of nitrogen, was admitted to the reactor so that over a 22 hour period, 39 grams (4.8 moles per mole of polyfluoroalkanol) of fluorine were fed to the reactor. The rate of feed of the fluorine was such that only traces of fluorine passed out through the outlet tube as shown by the fact that the effluent gas turned starch-potassium iodide paper only a faint blue. The temperature inside the reactor was kept at 3° C. to 5° C. by external cooling with a water-ice bath. At the end of the fluorination period, the unreacted fluorine in the equipment was replaced with nitrogen. The low-boiling volatile products, mainly hydrogen fluoride, were distilled directly from the disconnected reactor at a final inside reactor temperature of 34° C. The residue was a water-white liquid showing no evidence of carbon deposition from severe decomposition of the starting polyfluoroalkanol. On cooling this residue to 0° C., 250 ml. of anhydrous ether was added, and to the solution was added slowly with cooling a total of 7 grams of sodium fluoride to neutralize any residual hydrogen fluoride. The mixture was then filtered to remove the solid material and the filtrate was fractionally distilled in a spinning band type still. After removal of the solvent, the following fractions were collected and identified.

*Perfluorovaleraldehyde*

$(CF_3CF_2CF_2CF_2CHO)$

Perfluorovaleraldehyde is a water-white liquid with a characteristic pleasant odor and a boiling range of 45° C. to 52° C. at 760 mm. Hg pressure. It readily forms a hydrate which melts at 38° C. to 40° C. and a 2,4-dinitrophenylhydrazone derivative which melts at 101.5° C. to 102° C. Both the nuclear magnetic resonance and the infrared spectra of the 2,4-dinitrophenylhydrazone derivative show the presence of the $CF_3-$ group and the absence of the original $HCF_2-$ group, thus confirming the product as the 2,4-dinitrophenylhydrazone of perfluorovaleraldehyde.

*5H-Octafluorovaleraldehyde*

$(HCF_2CF_2CF_2CF_2CHO)$ 5H-octafluorovaleraldehyde is a water-white liquid having a boiling range of 84° C. to 86° C. at 760 mm. It readily forms a 2,4-dinitrophenylhydrazone derivative which, after recrystallization from isooctane, melts at 90° C. to 90.5° C. The nuclear magnetic resonance and the infrared spectra of the hydrazone derivative show the presence of the original $HCF_2-$ group and further characterize the product as the 2,4-dinitrophenylhydrazone of 5H-octafluorovaleraldehyde.

The condensate of the low boiling volatile products, distilled from the reactor at the completion of the reaction, and the condensate that collected in the cold trap on the outlet side of the reactor during the reaction were drowned in ice water. To the mixture was added 30% sodium hydroxide solution until no cloudiness developed on further addition of the caustic solution. The aqueous solution was then cooled to 0° C., made alkaline to Brilliant Yellow paper by the addition of calcium hydroxide, and filtered to remove the precipitated calcium fluoride. The filtrate was acidified to Congo red with concentrated sulfuric acid, and the acid solution was shaken with benzene to extract any benzene soluble components. A fraction from the fractionally distilled benzene solution was an acidic water-white liquid boiling at 160° C. to 164° C. at 760 mm. Hg pressure. This fraction was identified as 5H-octafluorovaleric acid by nuclear magnetic resonance and infrared spectra. The 5H-octafluorovaleric acid constituted a minor proportion of the products and was formed by hydrolysis of the volatile 5H-octafluorovaleryl fluoride to which a portion of the 1H,1H,5H-octafluoro-1-pentanol had been oxidized in the reactor.

Similarly, 1H,1H,3H-tetrafluoro-1-propanol, $$HCF_2CF_2CH_2OH$$

will yield 3H-tetrafluoropropionaldehyde and perfluoropropionaldehyde, and 1H,1H,11H-eicosafluoro-1-undecanol, $H(CF_2CF_2)_5CH_2OH$, will yield 11H-eicosafluoroundecylaldehyde and perfluoroundecylaldehyde.

EXAMPLE 2

This example is given for purposes of comparison.

The apparatus of Example 1 was used with the copper tacks replaced by a stainless steel bar, covered with polytetrafluoroethylene resin, which composed a magnetically driven stirrer. The reactor was charged with 86 grams of 1H,1H,9H-hexadecafluoro-1-nonanol of 99.5% purity and 175 grams of anhydrous hydrogen fluoride. While keeping the reaction solution at 10° C. to 15° C., 44 grams of fluorine gas was admitted to the reactor over a period of 18 hours. At the end of this time, the reactor was disconnected and the hydrogen fluoride allowed to evaporate at room temperature. The contents of the reactor were discharged onto ice, and the mixture made alkaline with aqueous ammonia. By steam distillation of the alkaline mixture, 31 grams of an oil heavier than water was collected. A fractional distillation of the oil gave a cut boiling at 107° C. at 760 mm. which was identified by nuclear magnetic resonance as comprising 68% perfluorooctane and 32% 1H-heptadecafluorooctane. The starting 1H,1H,9H-polyfluoro-1-nonanol had been oxidized to polyfluoro acids which were decarboxylated to yield the polyfluorooctanes. No aldehydes were detected in the reaction products by infrared analysis.

From the aqueous solution remaining after the steam distillation, a mixture of polyfluorononanoic acids was isolated as follows. The residual water solution was made strongly acid with concentrated sulfuric acid, and all ether-soluble components were extracted with ethyl ether. The ether was evaporated, and the residual material was distilled under reduced pressure. At 125° C. to 130° C. at 25 mm., 16 grams of a crystalline solid was collected. On recrystallization from chloroform, the product was identified by its infrared spectrum as the hydrate of a carboxylic acid and by its nuclear magnetic resonance spectrum as a 50–50 mixture of perfluorononanoic acid and 9H-hexadecafluorononanoic acid.

It will be understood that the preceding Example 1 is given for illustrative purposes solely and that this invention is not restricted to the specific embodiment described therein. On the other hand, it will be obvious to those skilled in the art that, subject to the limitations set forth in the general description, many variations can be made in the alcohols employed, the proportions of reactants, the conditions, the equipment, and the techniques used.

From the foregoing description, it will be apparent that this invention provides a novel process for the direct production of valuable polyfluoroaldehydes by the oxidation of polyfluoroalcohols and for the replacement of the omega-hydrogen in such compounds without decomposition or loss of the functional group. The process is economical, simple, and easy to operate and control. Therefore, it will be obvious that this invention constitutes a valuable advance in and contribution to the art.

The embodiments of the invention in which an exclusive property or privilege is claimed are defined as follows:

1. The process for preparing at least one polyfluoroaldehyde of the formula $X(CF_2)_nCHO$ wherein X represents a member of the group consisting of hydrogen and fluorine and $n$ is an integer of from 2 to 24 which comprises passing gaseous fluorine into a solution of a polyfluoroalcohol of the formula $X(CF_2)_nCH_2OH$ wherein X represents a member of the group consisting of hydrogen and fluorine and $n$ is an integer of from 2 to 24 in from 1 to about 10 parts by weight of anhydrous liquid hydrogen fluoride maintained at a temperature between −10° C. and +5° C., the fluorine being employed in a proportion of at least about 1 mole for each mole of the polyfluoroalcohol and being passed into the solution at about the rate at which it is consumed in the reaction.

2. The process for preparing at least one polyfluoroaldehyde of the formula $X(CF_2)_nCHO$ wherein X represents a member of the group consisting of hydrogen and fluorine and $n$ is an integer of from 2 to 24 which comprises passing gaseous fluorine into a solution of a polyfluoroalcohol of the formula $X(CF_2)_nCH_2OH$ wherein X represents a member of the group consisting of hydrogen and fluorine and $n$ is an integer of from 2 to 24 in from about 1.4 to about 2 parts by weight of anhydrous liquid hydrogen fluoride maintained at a temperature between −5° C. and +5° C., the fluorine being employed in a proportion of from about 1.1 to about 5 moles for each mole of the polyfluoroalcohol and being passed into the solution at about the rate at which it is consumed in the reaction.

3. The process for preparing polyfluoroaldehydes of the formula $X(CF_2)_nCHO$ wherein X represents a member of the group consisting of hydrogen and fluorine and $n$ is an integer of from 2 to 24 which comprises passing gaseous fluorine into a solution of a polyfluoroalcohol of the formula $H(CF_2)_nCH_2OH$ wherein $n$ is an integer of from 2 to 24 in from 1 to about 10 parts by weight of anhydrous liquid hydrogen fluoride maintained at a temperature between −10° C. and +5° C., the fluorine being employed in a proportion of at least about 1 mole for each mole of the polyfluoroalcohol and being passed into the solution at about the rate at which it is consumed in the reaction.

4. The process for preparing polyfluoroaldehydes of the formula $X(CF_2)_nCHO$ wherein X represents a member of the group consisting of hydrogen and fluorine and $n$ is an integer of from 2 to 24 which comprises passing gaseous fluorine into a solution of a polyfluoroalcohol of the formula $H(CF_2)_nCH_2OH$ wherein $n$ is an integer of from 2 to 24 in from about 1.4 to about 2 parts by weight of anhydrous liquid hydrogen fluoride maintained at a temperature between −5° C. and +5° C., the fluorine being employed in a proportion of from about 2.2 to about 5 moles for each mole of the polyfluoroalcohol and being passed into the solution at about the rate at which it is consumed in the reaction.

5. The process for preparing polyfluoroaldehydes of the formula $X(CF_2)_4CHO$ wherein X represents a member of the group consisting of hydrogen and fluorine which comprises passing gaseous fluorine into a solution of a polyfluoroalcohol of the formula $H(CF_2)_4CH_2OH$ in from 1 to about 10 parts by weight of anhydrous liquid hydrogen fluoride maintained at a temperature between −5° C. and +5° C., the fluorine being employed in a proportion of from about 2.2 to about 5 mole for each mole of the polyfluoroalcohol and being passed into the solution at about the rate at which it is consumed in the reaction.

6. The process for preparing polyfluoroaldehydes of the formula $XCF_2CF_2CHO$ wherein X represents a member of the group consisting of hydrogen and fluorine which comprises passing gaseous fluorine into a solution of a polyfluoro-alcohol of the formula $HCF_2CF_2CH_2OH$ in from 1 to about 10 parts by weight of anhydrous liquid hydrogen fluoride maintained at a temperature between −5° C. and +5° C., the fluorine being employed in a proportion of from about 2.2 to about 5 mole for each mole of the polyfluoroalcohol and being passed into the solution at about the rate at which it is consumed in the reaction.

7. The process for preparing polyfluoroaldehydes of the formula $X(CF_2CF_2)_4CHO$ wherein X represents a member of the group consisting of hydrogen and fluorine which comprises passing gaseous fluorine into a solution of a polyfluoroalcohol of the formula $$H(CF_2CF_2)_4CH_2OH$$

in from 1 to about 10 parts by weight of anhydrous liquid hydrogen fluoride maintained at a temperature between −5° C. and +5° C., the fluorine being employed in a proportion of from about 2.2 to about 5 mole for each mole of the polyfluoroalcohol and being passed into the solution at about the rate at which it is consumed in the reaction.

8. The process for preparing polyfluoroaldehydes of the formula $X(CF_2CF_2)_5CHO$ wherein X represents a member of the group consisting of hydrogen and fluorine which comprises passing gaseous fluorine into a solution of a polyfluoroalcohol of the formula $$H(CF_2CF_2)_5CH_2OH$$

in from 1 to about 10 parts by weight of anhydrous liquid hydrogen fluoride maintained at a temperature between −5° C. and +5° C., the fluorine being employed in a proportion of from about 2.2 to about 5 mole for each mole of the polyfluoroalcohol and being passed into the solution at about the rate at which it is consumed in the reaction.

References Cited in the file of this patent

Lichtin et al.: Jour. Amer. Chem. Soc., vol. 76 (1954), page 3729.

McBee et al.: Jour. Amer. Chem. Soc., vol. 75 (1953), pages 1609–1710.